US012552648B2

(12) United States Patent
Gerber et al.

(10) Patent No.: US 12,552,648 B2
(45) Date of Patent: Feb. 17, 2026

(54) APPARATUS FOR AIR CONTROL TO AN INFLATABLE OBJECT LIFT

(71) Applicant: Tidewater Marine Sales LLC, Riviera Beach, FL (US)

(72) Inventors: Charles Gerber, Stuart, FL (US); Jeremy C. Gerber, Stuart, FL (US)

( * ) Notice: Subject to any disclaimer, the term of this patent is extended or adjusted under 35 U.S.C. 154(b) by 0 days.

(21) Appl. No.: 19/025,325

(22) Filed: Jan. 16, 2025

(65) Prior Publication Data

US 2025/0243041 A1    Jul. 31, 2025

Related U.S. Application Data

(60) Provisional application No. 63/624,845, filed on Jan. 25, 2024.

(51) Int. Cl.
*B66F 3/25* (2006.01)
*B66F 3/35* (2006.01)

(52) U.S. Cl.
CPC ....... *B66F 3/25* (2013.01); *B66F 3/35* (2013.01); *B66F 2700/09* (2013.01)

(58) Field of Classification Search
CPC .......... B66F 3/25; B66F 3/35; B66F 2700/09
See application file for complete search history.

(56) References Cited

U.S. PATENT DOCUMENTS

| | | | | |
|---|---|---|---|---|
| 5,121,900 A * | 6/1992 | McDonald | ............... | B66F 3/35 254/2 R |
| 6,286,813 B1 * | 9/2001 | Coccaro | ................... | B66F 3/35 254/93 HP |
| 6,971,837 B1 * | 12/2005 | Williams | ................ | B66F 7/085 414/789.5 |
| 2007/0210542 A1 * | 9/2007 | Hammond | ............ | B62B 3/0643 414/490 |
| 2014/0219768 A1 * | 8/2014 | Holtman | ................... | B66F 5/04 414/800 |

(Continued)

OTHER PUBLICATIONS

Jan. 14, 2025 Excerpt from Lake Lifter website https://lakelifter.com/boat-lift-blower-motors/ AC Blower Motor Control Box (One Lift—One Valve).

(Continued)

*Primary Examiner* — Seahee Hong
(74) *Attorney, Agent, or Firm* — William J Connelly, III; Connelly Law PLLC

(57) ABSTRACT

An adjustable air control apparatus is disclosed. The apparatus is designed for an efficient inflation and deflation of bladders in an article lift. The apparatus integrates blowers, manifolds, air transmission ports, and a control panel featuring a processor for precise airflow regulation. The modular design of the air transmission ports allows customization based on the size of the article lift, enhancing scalability and adaptability. A quick release clamp facilitates an easy attachment and detachment of tubings, streamlining operations. The apparatus is coated with water-resistant materials, ensuring durability and safe operation in moist environments. Additionally, a memory unit stores critical parameters, such as a maximum fluid capacity of bladders, enabling optimal performance and system monitoring. The apparatus offers a compact, reliable, and efficient solution for air management in inflatable systems.

9 Claims, 8 Drawing Sheets

(56) References Cited

U.S. PATENT DOCUMENTS

2016/0355385 A1* 12/2016 Nielsen .................. B66F 3/35
2018/0273360 A1*  9/2018 Nasrin .................. B66F 3/35
2022/0371865 A1* 11/2022 Horn .................... B66F 3/35
2023/0406679 A1* 12/2023 Hobbs ................... B66F 3/35
2024/0343535 A1* 10/2024 Harris ................... B66F 3/35

OTHER PUBLICATIONS

Jan. 14, 2025 Excerpt from Lake Lifter website https://lakelifter.com/boat-lift-blower-motors/ AC Blower Motor Control Box (One Lift-Two Valves—One Tank Each)).

Jan. 14, 2025 Excerpt from Lake Lifter website https://lakelifter.com/boat-lift-blower-motors/ AC Blower Motor Control Box (One Lift—Three Valves).

* cited by examiner

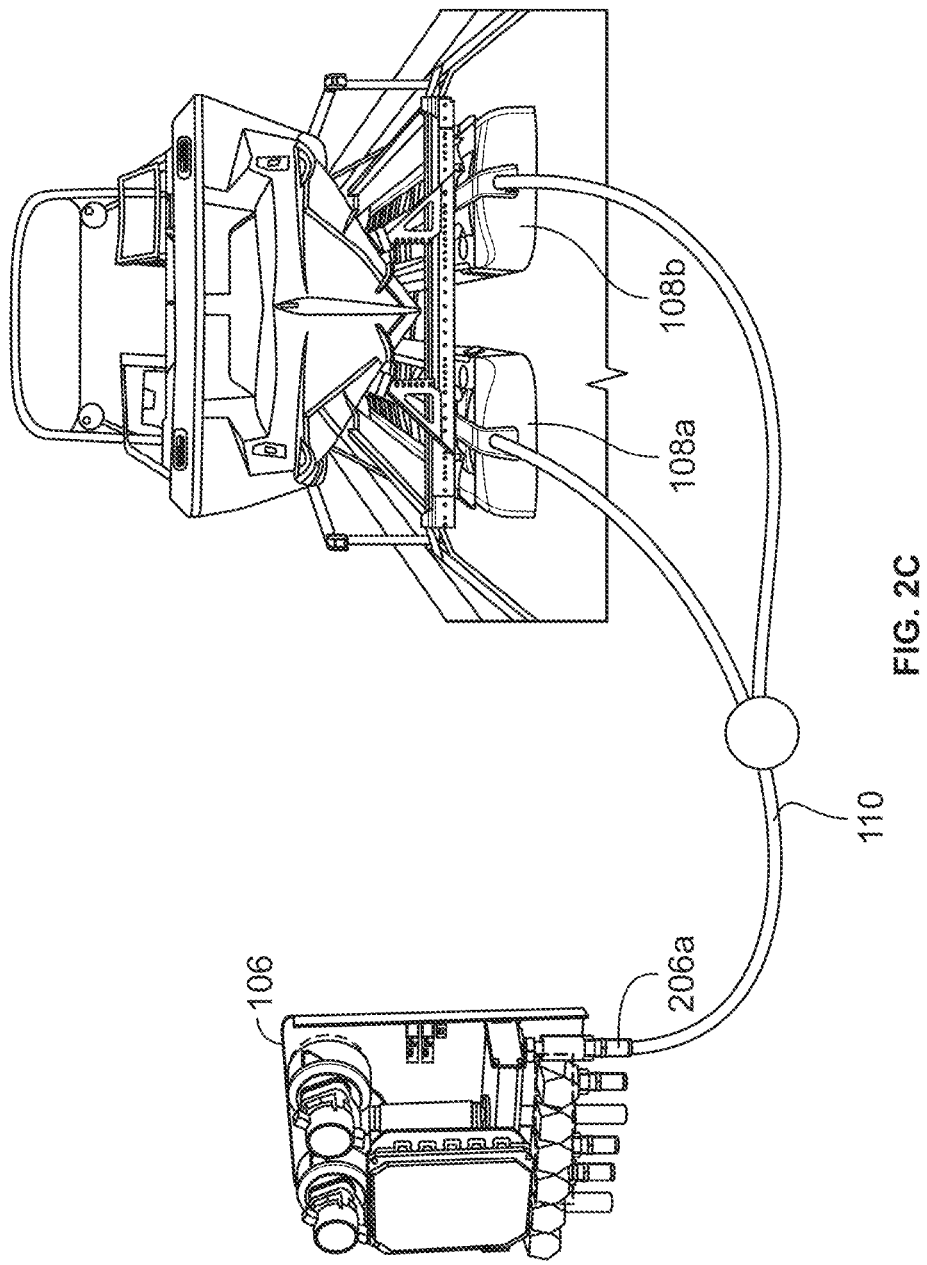

APPARATUS FOR AIR CONTROL TO AN INFLATABLE OBJECT LIFT

CROSS-REFERENCE TO RELATED APPLICATION

This application claims the benefit of U.S. Provisional Patent Application Ser. No. 63/624,845 filed on Jan. 25, 2024, titled "Apparatus for Air Control to an Inflatable Object Lift" the entire content of which is hereby incorporated by reference in its entirety.

BACKGROUND

Field of Invention

Embodiments of the present invention disclosed herein relate, in general, to a lift and, more particularly, to an adjustable air control apparatus.

Description of Related Art

Inflatable lift systems have become an integral part to various industries for elevating and stabilizing objects. The lift systems utilize hollow tanks or air bladders to generate buoyant force, enabling objects to be raised and held securely at a desired height. Such lift systems offer benefits, such as damage prevention, reduced maintenance, and improved access for inspection and repairs. As a result, they have found widespread use in applications ranging from industrial operations to recreational activities.

Conventional inflatable lift systems typically employ control panels to regulate airflow into and out of air bladders of the lift systems. The control panels are essential for ensuring even lifting and weight distribution, which prevents tilting and further minimizes structural stress. However, existing control panels often feature fixed configurations that restrict their adaptability to objects of varying sizes, shapes, and weights. In other words, conventional control panels which regulate airflow, also referred to as a blower motor control boxes, often comprise one valve, two valves, three valves, etc. This inflexibility limits their utility across diverse operational scenarios, such as expandable docks, as a user would need to purchase a new or different unit for small, medium, and large docks and/or watercraft. Additionally, the mechanisms responsible for airflow management and balance are frequently cumbersome and prone to wear, particularly in environments exposed to moisture, corrosive elements, or harsh conditions.

Traditional designs of the lift systems often rely on manual or semi-automated valves for inflation and deflation of the air bladders. These designs are inherently limited in scalability, requiring entirely different setups for objects of varying sizes or lifting capacities. The fixed nature of such lift systems increases costs and complexity, particularly for users handling diverse lifting needs. Moreover, components commonly used in these designs, such as metal parts, are susceptible to corrosion, electrical conductivity issues, and general wear and tear, which can lead to operational failures and increased maintenance demands.

Recent advancements have sought to incorporate automated control panels to improve the precision and convenience of leveling and inflation processes. While these developments have enhanced usability, they remain constrained by the inherent limitations of traditional designs of the lift systems. Common issues can include rigid valve attachments, non-expandable configurations, lack of easy-release mechanisms, and limited scalability, which reduce the overall effectiveness and adaptability of the traditional lift systems.

Thus, there is a need for an adjustable air control apparatus that can administer the aforementioned limitations more efficiently.

SUMMARY

Embodiments in accordance with the present invention may provide an adjustable air control apparatus. The apparatus comprises at least one blower adapted to generate air streams. The apparatus further comprises one or more manifolds adapted to receive the generated air streams from the at least one blower. The apparatus further comprises one or more air transmission ports, connected to the at least one blower through the one or more manifolds. The apparatus further comprises one or more valves attached onto the one or more air transmission ports using one or more quick release clamps. The one or more valves are adapted to provide at least one inlet passage for supplying the generated air streams into one or more bladders of at least one article lift through one or more tubings. The apparatus further comprises at least one control panel adapted to actuate the one or more valves to enable the supply of the generated air streams into the one or more bladders of the at least one article lift.

Embodiments in accordance with the present invention may provide an adjustable air control apparatus. The apparatus comprises at least one blower adapted to generate air streams. The apparatus further comprises at least one control panel connected to the at least one blower. The control panel comprises at least one input interface adapted to receive inputs for actuation of the at least one blower. The control panel further comprises at least one processor communicatively connected to the at least one input interface and to the at least one blower. The processor is configured to actuate the at least one blower to generate the air streams based on the received inputs from through the at least one input interface and actuate the one or more valves to supply the generated air streams into one or more bladders of an article lift.

Embodiments in accordance with the present invention may provide a method for inflation of one or more bladders of an article lift using an adjustable air control apparatus. The method comprises generating air streams using at least one blower; transmitting the generated air streams from the at least one blower to one or more manifolds; supplying the generated air streams into the one or more bladders of at least one article lift through one or more tubings via one or more air transmission ports; and actuating one or more valves, connected to the one or more air transmission ports, via at least one control panel to control the supply of the generated air streams into the one or more bladders of the at least one article lift.

Embodiments of the present invention may provide an adjustable air control apparatus that enables precise control over air streams using an integrated control panel and a processor, ensuring effective inflation and deflation of bladders of an article lift.

Embodiments of the present invention may provide an adjustable air control apparatus that may archive quick inflation and deflation via modular air transmission ports and a suction actuation of blowers, streamlining operation.

Embodiments of the present invention may provide an adjustable air control apparatus that may allow customization based on the size of the article lift, enhancing adaptability to various requirements.

Embodiments of the present invention may provide an adjustable air control apparatus that may be coated with thermoplastic materials, providing water and moisture insulation, thereby increasing longevity.

Embodiments of the present invention may provide an adjustable air control apparatus that may feature quick release clamps for releasing tubings. The quick release clamps may simplify attachment and detachment processes and reduce setup time.

Embodiments of the present invention may provide an adjustable air control apparatus that may exhibit waterproof collars for internal wirings, ensuring safe operation in moist environments, preventing electrical hazards.

Embodiments of the present invention may provide an adjustable air control apparatus that may be compatible with various power sources, including 110V/240V AC and 24V DC, making it suitable for diverse operational settings.

Embodiments of the present invention may provide an adjustable air control apparatus that may store critical parameters such as the maximum air capacity of the bladders, aiding in efficient operation and system monitoring.

Embodiments of the present invention may provide an adjustable air control apparatus that may include multiple manifolds and exhaust ports in a single apparatus to minimize space requirements and enhance portability.

Embodiments of the present invention may provide an adjustable air control apparatus that may facilitate easy replacement, repair, and upgrade, ensuring prolonged usability and reduced downtime.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The foregoing and other aspects of the embodiments disclosed herein are best understood from the following detailed description when read in connection with the accompanying drawings. For the purpose of illustrating the embodiments disclosed herein, there is shown in the drawings embodiments that are presently preferred, it being understood, however, that the embodiments disclosed herein are not limited to the specific instrumentalities disclosed. Included in the drawings are the following figures:

FIG. 2C illustrates a connectivity of the apparatus with the bladders of the article lift, according to another embodiment of the present invention disclosed herein;

Figure 1:
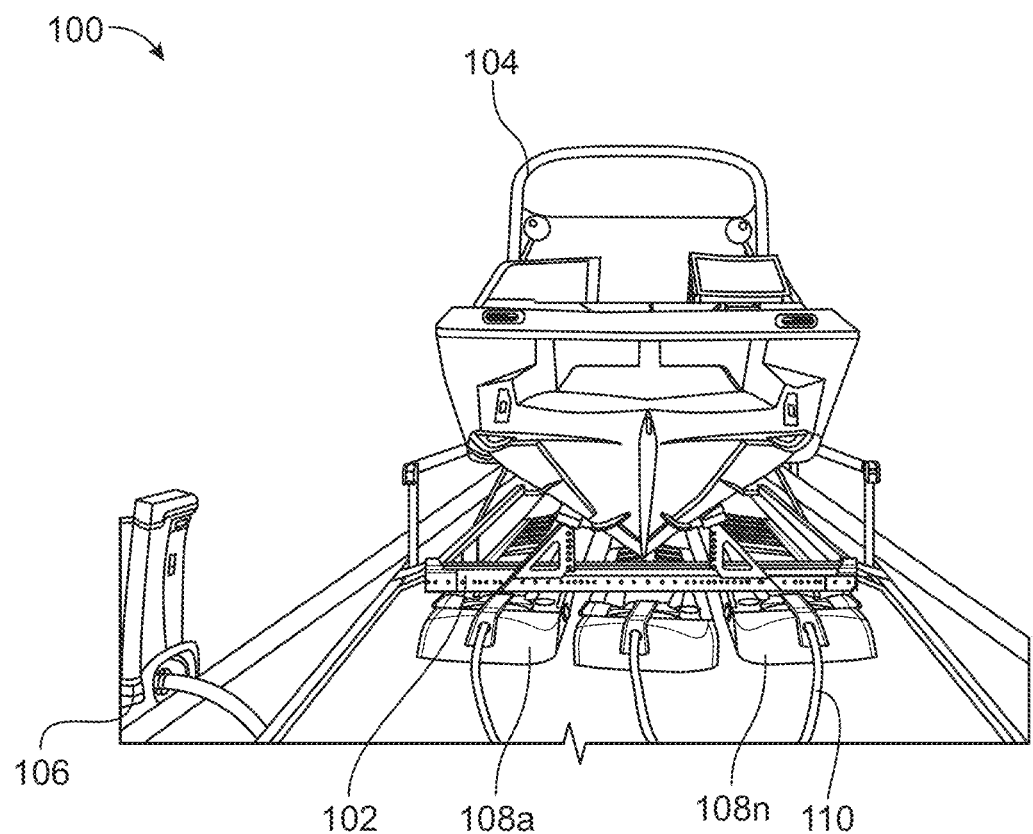
FIG. 1 illustrates a system for lifting an article using an article lift, according to embodiments of the present invention disclosed herein.

While embodiments of the present invention are described herein by way of example using several illustrative drawings, those skilled in the art will recognize the present invention is not limited to the embodiments or drawings described. It should be understood the drawings and the detailed description thereto are not intended to limit the present invention to the particular form disclosed, but to the contrary, the present invention is to cover all modifications, equivalents, and alternatives falling within the spirit and scope of embodiments of the present invention as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be described below in conjunction with an exemplary adjustable air control apparatus. Embodiments of the present invention are not limited to any particular type of an adjustable air control apparatus. Those skilled in the art will recognize the disclosed techniques may be used in any adjustable air control apparatus in which it is desirable to provide an interim adjustable air control apparatus.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation.

Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation, or technique.

FIG. 1 illustrates a system 100 for lifting an article, in an embodiment of the present invention. The system 100 may comprise an article lift 102 for moving an article, according to embodiments of the present invention. In an embodiment of the present invention, the article lift 102 may be adapted to uplift and/or down lift articles. In another embodiment of the present invention, the article lift 102 may be adapted to hold an elevated article at a designated height. The article lift 102 may be adapted to harness outwardly directed air pressure for upliftment of the articles.

The article lift 102 may be constructed of any material such as, but not limited to, a metallic material, a reinforced carbon fiber material, a High Density Polyethene (HDPE) material, and so forth. In a preferred embodiment of the present invention, the article lift 102 may be constructed of a stress bearing and a strength inducing material and may further be coated with a thermoplastic plumbing material. The thermoplastic plumbing material may be, but not limited to, Polyvinyl Chloride (PVC), Chlorinated Polyvinyl Chloride (CPVC), Polyethylene (PE), Cross-Linked Polyethylene (PEX), Polypropylene (PP), Polybutylene (PB), Acrylonitrile Butadiene Styrene (ABS), Polyphenylsulfone (PPSU), Ethylene Propylene Diene Monomer (EPDM), Polyamide (PA), Polycarbonate (PC), Fluorinated Ethylene Propylene (FEP), Perfluoroalkoxy Alkanes (PFA), or Polytetrafluoroethylene (PTFE), and so forth. Embodiments of the present invention are intended to include or otherwise cover any material, including known, related art, and/or later developed technologies, for construction of the article lift 102.

The article lift 102 may be installed at locations such as, but not limited to, a warehouse, a garage, a factory, a showroom, a production line, a railyard, a hanger, and so forth. In a preferred embodiment of the present invention, the article lift 102 may installed on a pier, a dock, a harbor, and so forth. Embodiments of the present invention are intended to include or otherwise cover any location, including known, related art, and/or later developed technologies, for installation of the article lift 102.

The articles uplifted using the article lift 102 may be for example, but not limited to, heavy machineries, closets, wardrobes, chest of drawers, vehicles, furniture, and so forth. In a preferred embodiment of the present invention, the article uplifted using the article lift 102 may be a watercraft 104. Embodiments of the present invention are intended to include or otherwise cover any type of article, including known, related art, and/or later developed technologies, which may need to be uplifted using the article lift 102. The watercraft 104 uplifted using the article lift 102 may be for example, but not limited to, a jet ski, a speed boat, a yacht, a sailboat, a rowboat, a kayak, a coracle, and so forth, and so forth. Embodiments of the present invention are intended to include or otherwise cover any type of the watercraft 104, including known, related art, and/or later developed technologies, which may need to be uplifted using the article lift 102.

In an embodiment of the present invention, the system 100 may comprise an apparatus 106 that may be adapted for controlling the movement of the article lift 102. In an embodiment of the present invention, the movement of the article lift 102 may be uplifting or lowering of the article lift 102. In an embodiment of the present invention, the apparatus 106 may be permanently paired and installed with the article lift 102. In another embodiment of the present invention, the apparatus 106 may be a handheld or a portable device that may be set-up and paired with the article lift 102 while being operated. According to an embodiment of the present invention, the apparatus 106 may be a set of components that may be adapted to operate in synchronization with the article lift 102 for controlling the movement of the article lift 102.

The components of the apparatus 106 may be constructed of material such as, but not limited to, a metallic material, a wooden material, a non-metallic material, a plastic material, and so forth. In a preferred embodiment of the present invention, the components of the apparatus 106 may be constructed of a rust proof material and may further be coated with a thermoplastic plumbing material. Embodiments of the present invention are intended to include or otherwise cover any, including known, related art, and/or later developed technologies, material for construction of the components of the apparatus 106. The working of the apparatus 106 may further be explained in detail in conjunction with FIG. 2A.

In an embodiment of the present invention, the article lift 102 may comprise bladders 108a-108n (hereinafter referred individually to as the bladder 108, and collectively referred to as the bladders 108). The bladders 108 may be arranged underneath the article that may be uplifted using the article lift 102. The bladders 108 may be inflated using air received from one or more sources of the apparatus 106. In another embodiment of the present invention, the air may be a gaseous matter that may be received from the one or more sources of the apparatus 106. The gaseous matter may be, but not limited to, a pure air, a natural air, a mixed air, a compressed air, a compressed nitrogen, a carbon dioxide, a helium, an oxygen-enriched air, an exhaust air from an industry, or other inert gases that may be suitable for inflating the bladders 108.

The one or more sources of the apparatus 106 may be for example, but not limited to, a motor, a pump, a vortex machine, a blowing apparatus, an air cylinder, and so forth. Embodiments of the present invention are intended to include or otherwise cover any sources of air for inflation of the bladders 108, including known, related art, and/or later developed technologies.

In an embodiment of the present invention, the bladders 108 may be inflated up to a maximum capacity that may be imprinted and/or etched onto the bladders 108. The maximum capacity may be a maximum volume of air that may be safely contained by the bladders 108 without inducing any puncture and/or rupture.

Further, when the bladders 108 are being inflated, the article arranged over the bladders 108 may start being elevated to an uplifted position. Furthermore, when the bladders 108 are fully inflated, then they may further be adapted to maintain a level of the article lift 102 at the uplifted position. Hence, maintaining the level of the article accommodated over the article lift 102.

In an exemplary scenario, if an article "X" needs to be uplifted using the article lift 102, then the deflated bladders 108 may be arranged under the article "X". The apparatus 106 may then be adapted to provide an air stream to the respective deflated bladders 108. As the bladders 108 are being filled with the air, the volume of the bladders 108 may increase simultaneously, leading to an inflation and increased buoyancy of the bladders 108. Moreover, as the bladders 108 may be inflated, the article "X" may be uplifted due to an increment of the volume and buoyancy of the bladders 108.

The bladders 108 may be constructed of any material such as, but not limited to, a silicone material, a rubber, a Low Density Polyethene (LDPE) material, and so forth. In a preferred embodiment of the present invention, the bladders 108 may be constructed of an elastic material. Embodiments of the present invention are intended to include or otherwise cover any, including known, related art, and/or later developed technologies, material for construction the bladders 108.

In an embodiment of the present invention, the article lift 102 may comprise tubings 110 that may be adapted to interconnect the bladders 108. The tubings 110 may provide a connection between the apparatus 106 and the bladders 108 to supply the air that may be filled into the bladders 108 for inflation and buoyancy of the bladders 108. The tubings 110 may be connected to the bladders 108 by using means such as, but not limited to, a hose, a notch, a valve, a socket, a port, and so forth. Embodiments of the present invention are intended to include or otherwise cover any means, including known, related art, and/or later developed technologies, for establishing a connectivity between the tubings 110 and the bladders 108.

In another embodiment of the present invention, the tubings 110 may be connected to the source of the apparatus 106. The air supplied by the source may be transmitted and filled into the bladders 108 via the tubings 110. The tubings 110 may be connected to the source of the apparatus 106 by using means such as, but not limited to, the hose, the notch, the valve, and so forth. Embodiments of the present invention are intended to include or otherwise cover any means, including known, related art, and/or later developed technologies, for establishing the connectivity between the tubings 110 and the source of the apparatus 106.

In yet another embodiment of the present invention, the tubings 110 may feature accessories such as, but not limited to, rivets, fasteners, and so forth. The accessories may ensure a leakproof and an airtight connectivity among the source of the apparatus 106, the bladders 108, and the tubings 110.

The tubings 110 may be constructed of any material such as, but not limited to, the silicone material, the rubber, the Low Density Polyethene (LDPE) material, and so forth. In a preferred embodiment of the present invention, the tubings 110 may be constructed of an elastic material. Embodiments of the present invention are intended to include or otherwise cover any, including known, related art, and/or later developed technologies, material for construction the tubings 110.

Figure 2A:
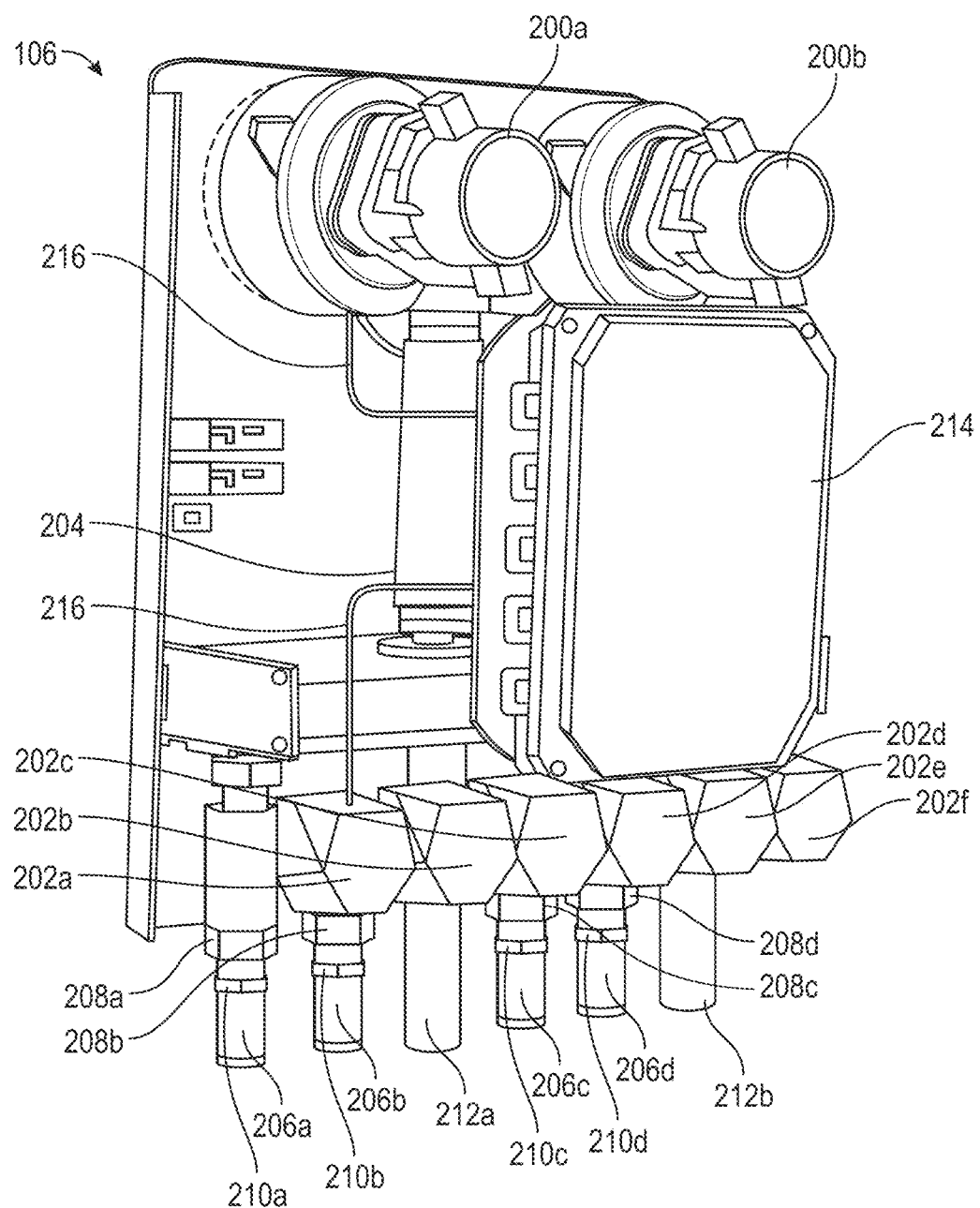
FIG. 2A illustrates an apparatus, according to embodiments of the present invention disclosed herein.

FIG. 2A illustrates the apparatus 106, according to embodiments of the present invention. In an embodiment of the present invention, the apparatus 106 may be enclosed in a housing (not shown). The housing may accommodate the components of the apparatus 106. The housing of the apparatus 106 may be constructed of material such as, but not limited to, the metallic material, the wooden material, a Bakelite material, a plastic material, and so forth. In a preferred embodiment of the present invention, the housing of the apparatus 106 may be constructed of an electrically insulative material and may further be coated with the thermoplastic plumbing material. Embodiments of the present invention are intended to include or otherwise cover any, including known, related art, and/or later developed technologies, material for construction of the housing of the apparatus 106.

The components of the apparatus 106 may be for example, but not limited to, blowers 200a-200b (hereinafter referred individually to as a first blower 200a and a second blower 200b, and collectively to as the blowers 200), valves 202a-202f (hereinafter referred individually to as a valve 202, and collectively to as the valves 202), manifolds 204, air transmission ports 206a-206d (hereinafter referred individually to as an air transmission port 206, and collectively to as the air transmission ports 206), exhaust ports 212a-212b, (hereinafter referred individually to as a first exhaust port 212a and a second exhaust port 212b, and collectively to as the exhaust ports 212), a control panel 214, and wirings 216.

In an embodiment of the present invention, the source of the apparatus 106 may be the blowers 200. The blowers 200 may be adapted to generate air streams. The generated air streams may further be supplied into the bladders 108 of the article lift 102 via the tubings 110. The blowers 200 may generate the air streams by utilizing motors (not shown). The motors may be adapted to rotate at very high speeds. The high-speed rotations of the motor may concentrate air to develop the air streams. The motor may be for example, but not limited to, a torque motor, a servo motor, a stepper motor, a Brushless Direct Current (BLDC) motor, and so forth. Embodiments of the present invention are intended to include or otherwise cover any type of the motor, including known, related art, and/or later developed technologies, that may concentrate air.

The air streams generated by the blowers 200 may further be released into the bladders 108 of the article lift 102. The air streams received into the bladders 108 may enable the inflation and increased buoyancy of the bladders 108. In an embodiment of the present invention, the blowers 200 may be modularly installed onto the apparatus 106. The number of the blowers 200 installed onto the apparatus 106 may be varied on a basis of a size of the article that may be lifted by the article lift 102. In an exemplary scenario, light weight articles such as, but not limited to, wardrobes, drawers, and so forth may be lifted by engagement of 'one' blower 200 such as the blower 200a. However, heavy weight articles such as, but not limited to, automobiles, watercrafts, and so forth may be lifted by engagement of 'more than one' blower 200 such as the blower 200a and the blower 200b.

In a preferred embodiment of the present invention, the respective blowers 200 may be digitally and an electronically controlled. The digital and electronical control of the blowers 200 may be carried out upon receipt of a digital signal from the control panel 214.

The blowers 200 may be for example, but not limited to, a fan blower, a wheel blower, a siren blower, an exhaust blower, a vacuum blower, and so forth. Embodiments of the present invention are intended to include or otherwise cover any type of the blowers 200, including known, related art, and/or later developed technologies, that may generate the air streams.

In an embodiment of the present invention, the valves 202 may be adapted to provide an inlet passage to enable a supply of the air streams generated by the blowers 200 towards the bladders 108 of the article lift 102. The valves 202 may state a direction of the flow of the air streams. In an exemplary scenario, the valves 202 may state a direction of the flow of the air streams from the blowers 200 to the bladders 108 to inflate the bladders 108 or the valves 202 may state a direction of the flow of air contained in the bladders 108 to the exhaust ports 212 to deflate the bladders 108.

The valves 202 may further prevent unintended flow and/or leakage of the air to and from the blowers 200 and the bladders 108. Furthermore, the valves 202 may be opened for ejecting the air contained in the bladders 108. The valves 202 may further comprise a stainless pin (not shown) that may maintain a constant and a uniform air pressure inside of the bladders 108. The stainless pin may provide a resistance between the air streams generated by the blowers 200 and an internal surface of the valves 202. The resistance developed by the stainless pin may prevent disbalancing of the air pressure and hence maintain the constant and the uniform air pressure inside the bladders 108.

Additionally, the valves 202 may further comprise a fail-safe mechanism (not shown). The fail-safe mechanism may be adapted to automatically open the valves 202 when the air contained in the bladders 108 may exceed the maximum air capacity. The automated opening of the valves 202 upon approaching the maximum air capacity may prevent any puncture and/or rupture in the bladders 108 due to overfilling. In an embodiment of the present invention, the air capacity is measured in pounds per square inch (PSI).

The valves 202 may be for example, but not limited to, a gate valve, a globe valve, a check valve, a ball valve, and so forth. Embodiments of the present invention are intended to include or otherwise cover any type of the valves 202, including known, related art, and/or later developed technologies. In a preferred embodiment of the present invention, the valves 202 may be a digitally and an electronically controlled. The digital and electronical control of the valves 202 may be carried out upon receipt of a digital signal from the control panel 214.

In an exemplary scenario, light weight articles such as, but not limited to, wardrobes, drawers, and so forth may be moved such as uplifted by activation of one valve 202. However, heavy weight articles such as, but not limited to, automobiles, watercrafts, and so forth may require the activation of additional valves 202. Further, the activation of the valves 202 may be controlled by the control panel 214.

In an embodiment of the present invention, the manifolds 204 may be designed into the housing of the apparatus 106. The manifolds 204 may provide a catacomb of an internal piping that may direct the air streams released by the valves 202 towards the air transmission ports 206. The manifolds 204 may be constructed of material such as, but not limited to, the metallic material, the wooden material, a ceramic material, a plastic material, and so forth. In a preferred embodiment of the present invention, the manifolds 204 may be constructed of a strength inducing and a stress bearing material and may further be coated with the thermoplastic plumbing material. Embodiments of the present invention are intended to include or otherwise cover any, including known, related art, and/or later developed technologies, material for construction of the manifolds 204.

In an embodiment of the present invention, the air transmission ports 206 may be connected to the manifolds 204. Encapsulating the manifolds 204, the air transmission ports 206 may be internally connected to the valves 202. The air transmission ports 206 may be adapted to release the air streams that may be internally received from the valves 202. The air transmission ports 206 may further be connected to the tubings 110. The tubings 110 may further carry the air streams released by the air transmission ports 206 into the bladders 108 of the article lift 102. In an embodiment of the present invention, the air transmission ports 206 may be modularly installed onto the apparatus 106. The number of the air transmission ports 206 installed onto the apparatus 106, and the number of the air transmission ports 206 engaged with the tubings 110 may vary on a basis of a size of the article that may be moved by the article lift 102. In an exemplary scenario, light weight articles such as, but not limited to, wardrobes, drawers, and so forth may be moved such as uplifted by engagement of one air transmission ports 206 with the bladders 108 via the tubings 110. However, heavy weight articles such as, but not limited to, automobiles, watercrafts, and so forth may be moved by the addition of several additional air transmission ports 206 with apparatus 106 and respective bladders 108 via the tubings 110. In a preferred embodiment of the present invention, a user may adapt the apparatus 106 for larger weight articles and additional bladders by the incorporation of additional air transmission ports 206, without the need of having to purchase or integrate an additional or separate blower apparatus.

In another embodiment of the present invention, the tubings 110 may directly be connected to the valves 202 of the apparatus 106 in a manner similar to the air transmission ports 206.

For example, in an embodiment of the present invention, the apparatus 106 may comprise six valves 202, thus giving the user the ability to modify and/or adapt the apparatus 106 to accommodate from one to up to six transmission ports 206.

The air transmission ports 206 may be constructed of material such as, but not limited to, the metallic material, a reinforced carbon fiber material, the plastic material, and so forth. In a preferred embodiment of the present invention, the air transmission ports 206 may be constructed of a strength inducing and a stress bearing material and may further be coated with the thermoplastic plumbing material. Embodiments of the present invention are intended to include or otherwise cover any, including known, related art, and/or later developed technologies, material for construction of the air transmission ports 206.

In an embodiment of the present invention, the valves 202 and air transmission ports 206 may comprise quick release clamps 208a-208d (hereinafter referred individually to as a quick release clamp 208, and collectively to as the quick release clamps 208). The quick release clamps 208 may be adapted to enable a connectivity of the air transmission ports 206 with the valves 202. The quick release clamps 208 may enable a quick release and a fast disassociation of the valves 202 from the air transmission ports 206. The quick release clamps 208 may involve utilization of none of any specialized tools and/or hardware for disassociation of the valves 202 from the air transmission ports 206.

In a preferred embodiment of the present invention, the quick release clamp 208 may be a single set screw that may be adapted to tighten into a slot provided on a side of each or some of the air transmission ports 206 for enabling a fitting of the valves 202 with the each or some of the air transmission ports 206. As the single set screw tightens, it may pull the fitting of the valves 202 tighter into the air transmission ports 206 and/or further to the manifolds 204. The valves 202 may be released from the air transmission ports 206 by carrying out a flicking and/or a separating action onto the single set screw and/or the valves 202.

In further embodiments of the present invention, the quick release clamps 208 may be a fastening mean such as, but not limited to, magnets, ratchets, jacks, pins and so forth, that may enable an auto-alignment of the valves 202 onto the air transmission ports 206. Moreover, the quick release clamps 208 may ensure a rigid, an airtight, and a leakproof, connectivity between the valves 202 and the air transmission ports 206.

In an embodiment of the present invention, the air transmission ports 206 may further comprise retaining pins 210a-210d (hereinafter referred individually to as a retaining pin 210, and collectively to as the retaining pins 210). The retaining pins 210 may be adapted to secure the tubings 110 onto the air transmission ports 206. The retaining pins 210 may be adapted to be wrapped around and tightened on the tubings 110, upon accommodation of the tubings 110 on the air transmission ports 206. Embodiments of the present invention are intended to include or otherwise cover any means for securing the tubings 110 onto the air transmission ports 206, including known, related art, and/or later developed technologies.

In an embodiment of the present invention, the exhaust ports 212 may be connected with the manifolds 204. The exhaust ports 212 may be adapted to provide an exhaust passage for ejection of the air contained into the bladders 108. The air contained into the bladders 108 may be ejected by opening the valves 202. As the valves 202 may be opened, the air contained into the bladders 108 may traverse in a reverse direction, coming into the manifolds 204 from the tubings 110 via the air transmission ports 206. The air approached into the manifolds 204 may automatically be ejected from the exhaust ports 212, as there may be no resistance between the manifolds 204 and the exhaust ports 212. Further, to stop an ejection of the air contained into the bladders 108, the valves 202 may be closed. In an embodiment of the present invention, the air contained into the bladders 108 may be ejected in cases such as, but not limited to, the article lift 102 may needed to be lowered or the air contained in the bladders 108 may exceed the maximum capacity.

The exhaust ports 212 may be constructed of material such as, but not limited to, a metallic material, a reinforced carbon fiber material, a plastic material, and so forth. In a preferred embodiment of the present invention, the exhaust ports 212 may be constructed of a strength inducing and a stress bearing material and may further be coated with the thermoplastic plumbing material. Embodiments of the present invention are intended to include or otherwise cover any, including known, related art, and/or later developed technologies, material for construction of the exhaust ports 212.

In an embodiment of the present invention, the control panel 214 may be adapted to activate the blowers 200 and the respective valves 202 for providing an optimum circulation of the air streams, to and from the bladders 108 for inflation or deflation, for maintaining the level of the article lift 102 while uplifting or lowering respectively. In an embodiment of the present invention, the control panel 214 may be configured manually or automatically to sense the number of valves 202 and transmission ports 206 to regulate the flow of air to and from the respective bladders 108. The control panel 214 may also be configured to receive signals from a sensor (not shown) to sense the levels of the bladders 108 on to a surface. The sensor may be, but not limited to an accelerometer, a gyroscope, a pressure sensor, an ultrasonic sensor, an infrared sensor, a load cell, a proximity sensor, a capacitive sensor, an optical sensor, a Hall-effect sensor, a piezoelectric sensor, a strain gauge, a resistive sensor, an inclinometer, a LASER distance sensor, a Light Detection and Ranging (LiDAR) sensor, a thermal sensor, a magnetometer, and so forth. Embodiments of the present invention are intended to include or otherwise cover any sensor for sensing the levels of the bladders 108, including known, related art, and/or later developed technologies.

In an exemplary scenario of the present invention, the sensor may be configured to detect an orientation and/or a tilt of the article lift 102 by measuring changes in acceleration along one or more axis of the article lift 102. These measurements may enable the control panel 214 to determine an inclination of the bladders 108 relative to the surface. The control panel 214 may further be configured to activate the blowers 200 and respective valves 202 to dynamically adjust the inflation or deflation of the bladders 108 to maintain the level of the article lift 102. This adjustment mechanism may prevent uneven lifting or instability, thereby enhancing the operational efficiency and safety of the control panel 214.

In an embodiment of the present invention, the control panel 214 may be implemented in a single chip or as a "system on a chip". The control panel 214 may include other components such as, but not limited to, an Application-Specific Integrated Circuit (ASIC) (not shown), a Digital Signal Processor (DSP) (not shown), and so forth for specific controls as per the requirement of the apparatus 106. For example, the Digital Signal Processor (DSP) may be required to process inputs from any sensor (not shown) connected to the apparatus 106. The control panel 214 and its working may further be explained in conjunction with FIG. 3.

In an embodiment of the present invention, the wirings 216 may be adapted to provide an electrical conductivity and connectivity among the blowers 200, the valves 202, and the control panel 214. The wirings 216 may be passaged inside of waterproof collars (not shown). The waterproof collars may prevent water contact and moisture buildup on the wirings 216.

In an embodiment of the present invention, the wirings 216 may have a conductive inner wire. The conductive inner wire may be coated with a layer of insulation to prevent short-circuit, in an embodiment of the present invention. The conductive inner wire of the wirings 216 may be constructed of electrically conductive material. The conductive material may be such as, but not limited to, a copper material, a silver material, a golden material, an aluminum material, and so forth. Embodiments of the present invention are intended to include or otherwise cover any, including known, related art, and/or later developed technologies, material for construction of the conductive inner wire of the wirings 216.

The layer of insulation of the wires in the wirings 216 may be constructed of material such as, but not limited to, a plastic material, a rubber material, a silicon material, and so forth. In a preferred embodiment of the present invention, the layer of insulation of the wires in the wirings 216 may be constructed of an electrically insulative material and may further be coated with the thermoplastic plumbing material. Embodiments of the present invention are intended to include or otherwise cover any, including known, related art, and/or later developed technologies, material for construction of the layer of insulation of the wires in the wirings 216.

Figure 2B:
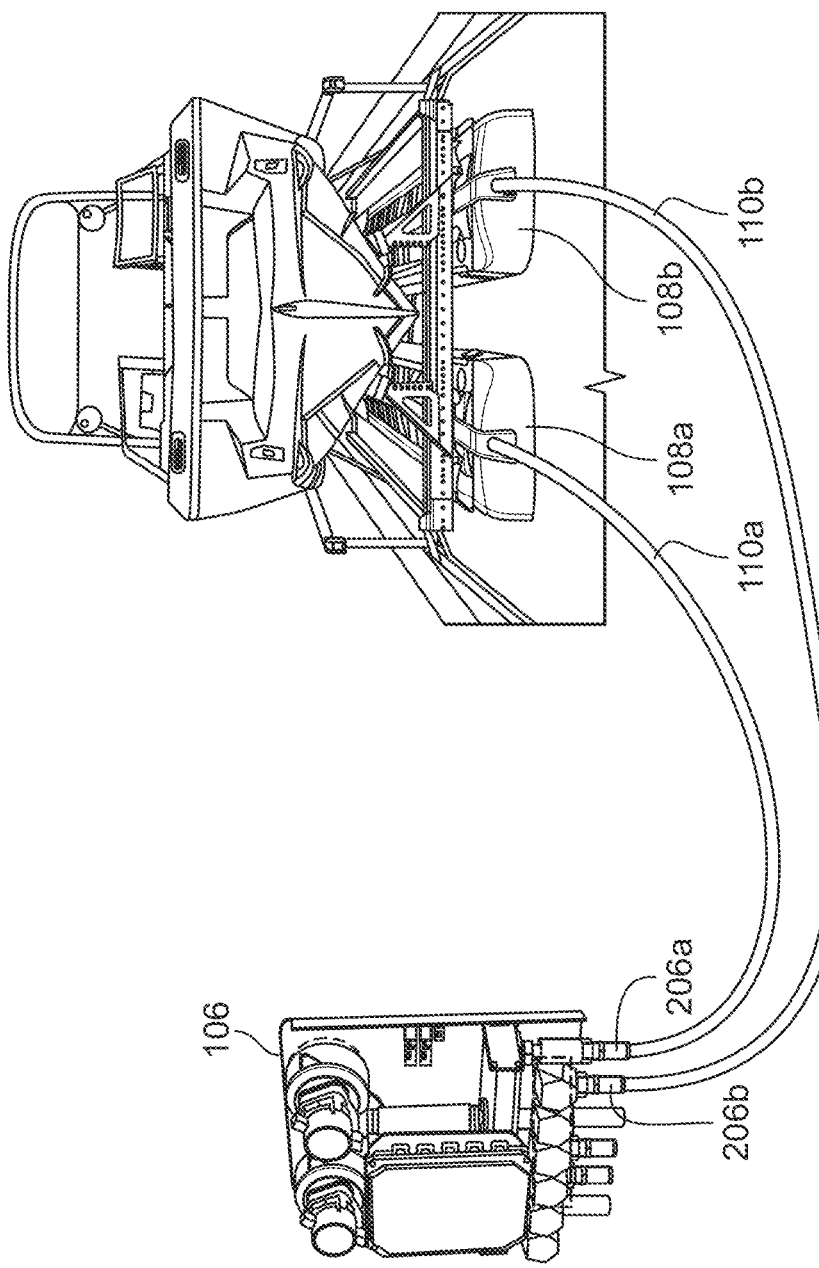
FIG. 2B illustrates a connectivity of the apparatus with bladders of the article lift, according to embodiments of the present invention disclosed herein.

FIG. 2B illustrates a connectivity of the apparatus 106 with the bladders 108 of the article lift 102, according to embodiments of the present invention. In an embodiment of the present invention, each bladder 108a-108b may be individually connected to the air transmission ports 206a-206b engaging the tubings 110a-110b. The individual connectivity of the bladders 108a-108b with the air transmission ports 206a-206b may enable a tapering or an ill-balancing of the article uplifted using the article lift 102. The tapering of the article may enable an underneath reachability. The underneath reachability may enable provisions such as, but not limited to, maintenance, cleaning, installation of accessories, and so forth. Embodiments of the present invention are intended to include or otherwise cover any provisions, including known, related art, and/or later developed technologies, that may be enabled by the tapering of the article uplifted using the article lift 102.

In an exemplary scenario, the bladder 108a may be individually connected to the air transmission port 206a via the tubing 110a. Similarly, the bladder 108b may be connected to the air transmission port 206b via the tubing 110b. Furthermore, if a right side of the article lift 102 may be required to be uplifted more comparatively to a left side of the article lift 102, then the apparatus 106 may release more air streams from the air transmission port 206a and may release less air streams from the air transmission port 206b. In such embodiments of the present invention, the bladder 108a may be filled with more air when compared with the bladder 108b. Hence, uplifting the right side of the article lift 102 more than the left side of the article lift 102 in order to maintain a balance of the article.

Similarly, if the left side of the article lift 102 may be required to be uplifted more comparatively to the right side of the article lift 102, then the apparatus 106 may release more air streams from the air transmission port 206b and may release less air streams from the air transmission port 206a. In such embodiments of the present invention, the bladder 108b may be filled with more air when compared with the bladder 108a. Hence, uplifting the left side of the article lift 102 more than the right side of the article lift 102.

FIG. 2C illustrates a connectivity of the apparatus 106 with the bladders 108, according to another embodiment of the present invention. In an embodiment of the present invention, each of the bladders 108a-108b may be combinedly connected to an air transmission port 206a engaging the tubings 110. The tubings 110 may bifurcate or may be distributed at a junction, such that each of the bifurcations may further be connected to the bladders 108a-108b. The combined connectivity of the bladders 108a-108b with the air transmission port 206a may enable a leveled and a balanced uplifting of the article using the article lift 102. The balanced uplifting of the article may enable an underneath reachability. The underneath reachability may enable provisions such as, but not limited to, maintenance, cleaning, installation of accessories, and so forth. Embodiments of the present invention are intended to include or otherwise cover any provisions, including known, related art, and/or later developed technologies, that may be enabled by the balanced uplifting of the article using the article lift 102.

Figure 3:
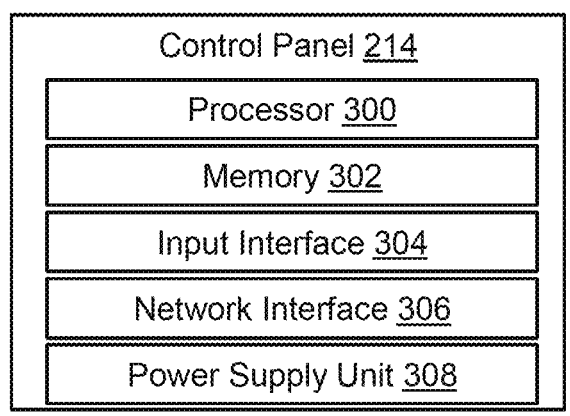
FIG. 3 illustrates a block diagram of a control panel of the apparatus, according to embodiments of the present invention disclosed herein.

FIG. 3 illustrates a block diagram of the control panel 214 of the apparatus 106, according to embodiments of the present invention. The control panel 214 may comprise components such as, but not limited to, a processor 300, a memory 302, an input interface 304, a network interface 306, and a power supply unit 308. Further, the components of the control panel 214 may be coated with the thermoplastic plumbing material for developing insulation against water and moisture.

In an embodiment of the present invention, the processor 300 may be electronically and digitally connected to the blowers 200, respective valves 202 and/or to the input interface 304. Further, the connection established among the processor 300, the blowers 200, and the input interface 304 may enable a flow of signals and data. The processor 300 may be configured to receive the maximum capacity of the bladders 108 of the article lift 102 from the memory 302. The processor 300 may further be configured to execute computer-executable instructions to generate an output relating to the system 100. The processor 300 may be for example, but not limited to, a Programmable Logic Control (PLC) unit, a microprocessor, a development board, and so forth. Embodiments of the present invention are intended to include or otherwise cover any type of the processor 300, including known, related art, and/or later developed technologies. In an embodiment of the present invention, the working of the processor 300 may further be explained in detail in conjunction with FIG. 4.

In an embodiment of the present invention, the memory 302 may be adapted to store the maximum capacity of the bladders 108 of the article lift 102. The maximum capacity of the bladders 108 stored in the memory 302 may enable the processor 300 to prevent an over-inflation of the bladders 108. In an embodiment of the present invention, the memory 302 may store executable instructions that when executed by the processor 300 may perform steps required to control the operations of the control panel 214. The memory 302 may further be adapted to store data associated with, or generated by the execution of the steps. In an embodiment of the present invention, the memory 302 may be a non-transitory storage medium. In an embodiment of the present invention, non-limiting examples of the memory 302 may be a Read Only Memory (ROM), a Random-Access Memory (RAM), an Erasable Programmable Read Only Memory (EPROM), an Electrically Erasable Programmable Read Only Memory (EEPROM), a hard drive, a removable media drive for handling memory cards, and so forth. Embodiments of the present invention are intended to include or otherwise cover any type of the memory 302, including known, related art, and/or later developed technologies.

In an embodiment of the present invention, the input interface 304 may be a front face of the control panel 214, and therefore the front face of the apparatus 106. In an embodiment of the present invention, the input interface 304 may be adapted to receive inputs for actuation of the blowers 200. In an embodiment of the present invention, the input interface 304 may enable a connection of the control panel 214 to an external input device (not shown) such as a keyboard, a display device, a pointing device or other Input/Output (I/O) devices. Embodiments of the present invention are intended to include or otherwise cover any type of the external input device, including known, related art, and/or later developed technologies, that may be connected with the input interface 304. The external input device may be configured for receiving inputs, issuing commands, or presenting outputs to a user operating the apparatus 106. In one embodiment of the present invention, the input interface 304 may enable a connection of the control panel 214 to sensors (not shown).

The input interface 304 may be adapted to be interfered with and operated by the user. Hence, being installed in a safe and comfortably approachable location. The external input device connected to the input interface 304 may be adapted to control inputs of the blowers 200 and respective valves 202. The inputs of the blowers 200 and respective valves 202 controlled through the input interface 304 may be for example, but not limited to, an actuation of the blowers 200, a de-actuation of the blowers 200, a suction actuation of the blowers 200, a suction de-actuation of the blowers 200, and so forth. Embodiments of the present invention are intended to include or otherwise cover any inputs of the blowers 200, including known, related art, and/or later developed technologies, that may be controlled through the input interface 304. In an embodiment of the present the input interface 304 may also be adapted to control and regulate air flow through the respective valves 202.

In an embodiment of the present invention, the input interface 304 may be a wired interface such as, but not limited to, a Universal Serial Bus (USB), a Personal System/2 (PS/2) interface, and so forth. Embodiments of the present invention are intended to include or otherwise cover any type of the wired input interface 304, including known, related art, and/or later developed technologies. In an embodiment of the present invention, the input interface 304 may be a wireless interface such as, but not limited to, a Wireless Fidelity (Wi-Fi) interface, a Bluetooth interface, and so forth. Embodiments of the present invention are intended to include or otherwise cover any type of the wireless input interface 304, including known, related art, and/or later developed technologies.

In an embodiment of the present invention, the network interface 306 may enable a remote communication with the control panel 214 over a computer network. The computer network may be for example, but not limited to, a Wide Area Network (WAN), a Local Area Network (LAN), a Long Term Evolution (LTE) network, a Wireless-Fidelity (Wi-Fi) network, a directed-projected wireless network, or any other network known in the art for establishing remote communication between the control panel 214 and the external input device. For example, the network interface 306 may be used for controlling the operations and/or present output of the control panel 214 remotely from/to the external input device. The external input device may be, but not limited to, a user device, such as a computer, a smart phone, a mobile phone, a smart watch, a key fob, and so forth, connected over the computer network.

In an embodiment of the present invention, the power supply unit 308 may be adapted to supply operational power to the blowers 200. Further, the power supply unit 308 may be adapted to supply operational power to the processor 300 and the input interface 304. In an embodiment of the present invention, the operational power supplied by the power supply unit 308 may be for example, but not limited to, a 110 Volts (V) Alternating Current (AC), a 240 Volts (V) Alternating Current (AC), a 24 Volts (V) Direct Current (DC), and so forth. Embodiments of the present invention are intended to include or otherwise cover any operational power, including known, related art, and/or later developed technologies, that may be supplied by the power supply unit 308. The operational power supplied by the power supply unit 308 may traverse among the blowers 200, the processor 300, and the input interface 304 using the wirings 216.

In an exemplary embodiment of the present invention, the power supply unit 308 may supply the operational power from a battery. In another exemplary embodiment of the present invention, the power supply unit 308 may supply the operational power from a wall-outlet power supply. In yet another exemplary embodiment of the power supply unit 308 may supply the operational power from any source.

In an embodiment of the present invention, the battery power supply may be from a rechargeable battery. In another embodiment of the present invention, the battery power supply may be from a non-rechargeable battery. The battery for power supply may be of any composition such as, but not limited to, a Nickel-Cadmium battery, a Nickel-Metal Hydride battery, a Zinc-Carbon battery, a Lithium-Ion battery, and so forth. Embodiments of the present invention are intended to include or otherwise cover any composition of the battery, including known, related art, and/or later developed technologies.

In an embodiment of the present invention, the wall-outlet power supply may be from a grid power line supply. In another embodiment of the present invention, the wall-outlet power supply may be from a generator line power supply. The wall-outlet power supply may be of any rating such as, but not limited to, a 110-volt supply, a 220-volt supply, and so forth. Embodiments of the present invention are intended to include or otherwise cover any rating of the wall-outlet power supply, including known, related art, and/or later developed technologies.

According to an embodiment of the present invention, the power supply unit 308 may supply an Alternating Current (AC) power supply. According to another embodiment of the present invention, the power supply unit 308 may supply a Direct Current (DC) power supply. According to yet another embodiment of the present invention, the power supply unit 308 may supply any type of power supply.

Figure 4:
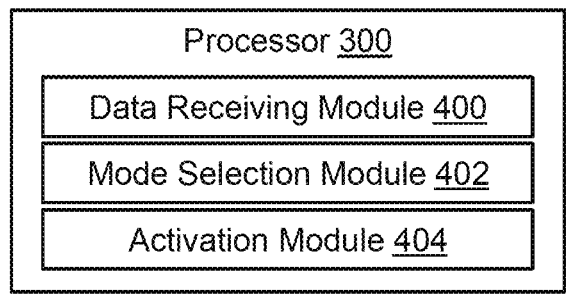
FIG. 4 illustrates a block diagram of a processor of the control panel, according to embodiments of the present invention disclosed herein.

FIG. 4 illustrates a block diagram of the processor 300 of the control panel 214, according to embodiments of the present invention. The processor 300 may comprise the computer-executable instructions in form of programming modules such as a data receiving module 400, a mode selection module 402, and an activation module 404.

In an embodiment of the present invention, the data receiving module 400 may be configured to receive inputs related to the blowers 200 from the input interface 304. The inputs related to the blowers 200 may be for example, but not limited to, an actuation of the blowers 200, a de-actuation of the blowers 200, a suction actuation of the blowers 200, a suction de-actuation of the blowers 200, air flow through the respective valves 202, and so forth. Embodiments of the present invention are intended to include or otherwise cover any inputs relating to the blowers 200, including known, related art, and/or later developed technologies, that may be controlled through the input interface 304. The data receiving module 400 may further be configured to transmit the received inputs related to the blowers 200 to the mode selection module 402.

In an embodiment of the present invention, the mode selection module 402 may be activated upon receipt of the inputs related to the blowers 200 from the data receiving module 400. The mode selection module 402 may be configured to enable the blowers 200 to shift a mode of operation based on the received inputs. In an embodiment of the present invention, the mode selection module 402 may be configured to shift the mode of operation of the blowers 200 into an actuation mode. Upon shifting the mode of operation of the blowers 200 into the actuation mode, the mode selection module 402 may transmit an inflation signal to the activation module 404.

In another embodiment of the present invention, the mode selection module 402 may be configured to shift the mode of operation of the blowers 200 into a suction actuation mode. Upon shifting the mode of operation of the blowers 200 into the suction actuation mode, the mode selection module 402 may transmit a deflation signal to the activation module 404.

In an embodiment of the present invention, the activation module 404 may be activated upon receipt of the inflation signal from the mode selection module 402. The activation module 404 may be configured to activate the blowers 200 in the actuation mode. The activation module 404 may further be configured to open the valves 202 to enable the supply of the generated air streams into the bladders 108.

Further, the actuation of the blowers 200 may initiate the generation and supply of the air streams into the bladders 108. Furthermore, after an ingestion of the maximum capacity inside of the bladders 108, the activation module 404 may be configured to deactivate the blowers 200. Hence, stopping the generation and supply of the air streams into the bladders 108. Additionally, upon deactivation of the blowers 200, the activation module 404 may be configured to close the valves 202 to enable the containment of the transmitted air inside the bladders 108. The closing of the valves 202 may further prevent leakage of the air transmitted into the bladders 108.

In another embodiment of the present invention, the activation module 404 may be activated upon receipt of the deflation signal from the mode selection module 402. The activation module 404 may be configured to activate the blowers 200, in the suction actuation mode. The activation module 404 may further be configured to open the valves 202 to enable the ejection of the air contained inside of the bladders 108 through the exhaust ports 212.

Further, the suction actuation of the blowers 200 may initiate a suction of the air contained inside of the bladders 108. Furthermore, after suction and ejection of the air contained inside of the bladders 108, the activation module 404 may be configured to deactivate the blowers 200. Hence stopping the suction actuation of the blowers 200, leading to a stop on the suction and releasing of the air contained inside of the bladders 108. Additionally, upon complete ejection of the air contained inside of the bladders 108, the activation module 404 may be configured to close the valves 202. The closing of the valves 202 may further prevent any movement of the air to and from the bladders 108 through the exhaust ports 212.

In yet another embodiment of the present invention, the activation module 404 may be configured to activate an external input device connected with the input interface 304. The activated external input device may enable the user to manually provide input to the blowers 200 and the valves 202 for inflation and/or deflation of the bladders 108.

Figure 5:
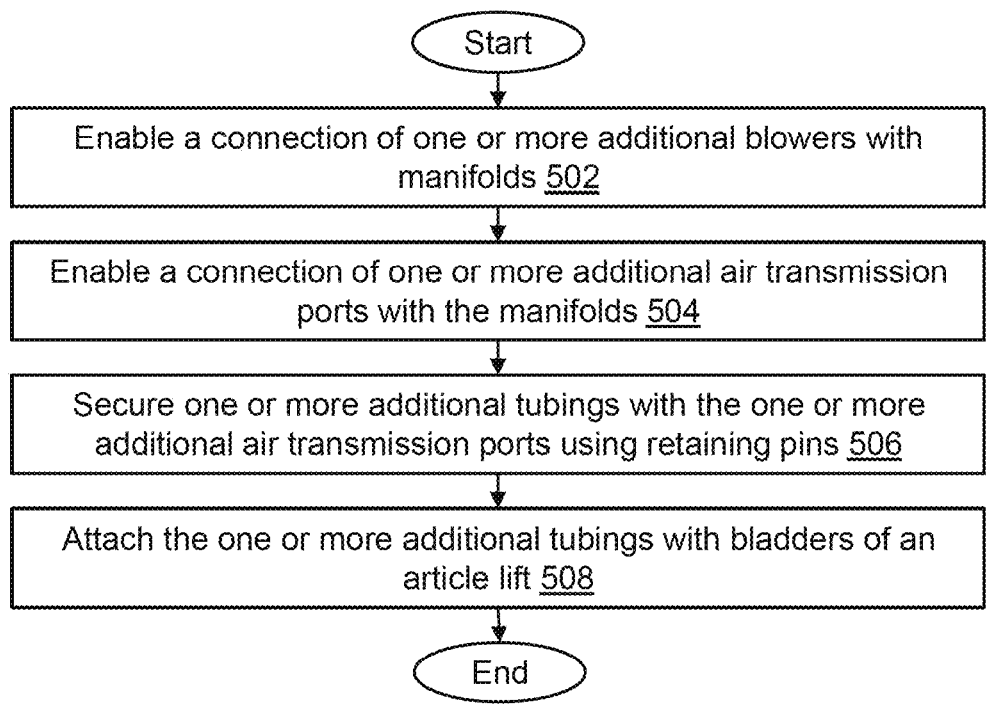
FIG. 5 illustrates a method for increasing an efficacy of the article lift, according to embodiments of the present invention disclosed herein.

FIG. 5 illustrates a method 500 for increasing an efficacy of the article lift 102, according to embodiments of the present invention.

At step 502, the apparatus 106 may enable a connectivity of the additional blower 200b with the manifolds 204. The additional blower 200b may be installed with the blower 200a, when the heavy weight articles may need to be uplifted by the article lift 102.

At step 504, the apparatus 106 may enable a connectivity of additional air transmission ports 206b-206d with the manifolds 204. The additional air transmission ports 206b-206d may be installed with the air transmission ports 206a, when the heavy weight articles may need to be uplifted by the article lift 102.

At step 506, the apparatus 106 may enable a securing of additional tubings 110 with the additionally installed air transmission ports 206b-206d using the retaining pins 210.

At step 508, the additional tubings 110 may be attached to the bladders 108 of the article lift 102.

Figure 6:
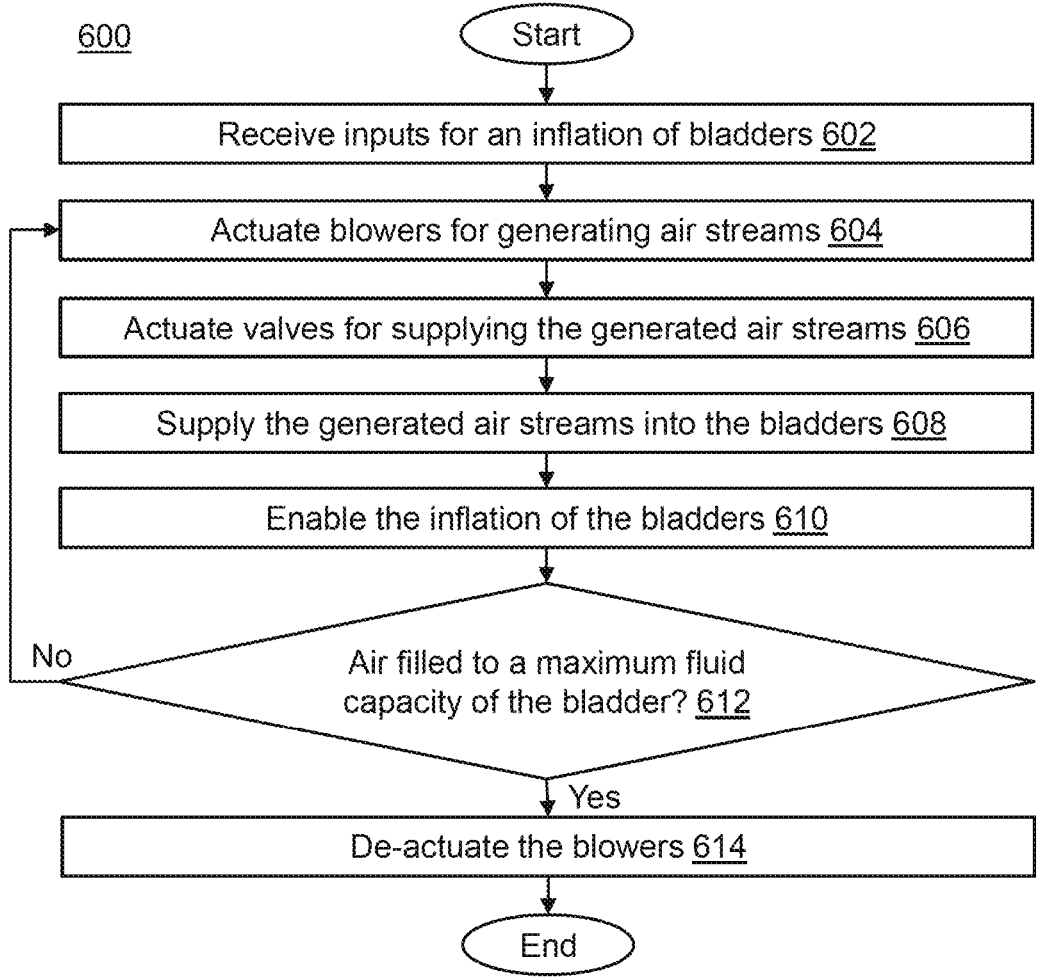
FIG. 6 illustrates a method for inflation of the bladders of the article lift, according to embodiments of the present invention disclosed herein.

FIG. 6 illustrates a method 600 for the inflation of the bladders 108 of the article lift 102, according to embodiments of the present invention.

At step 602, the apparatus 106 may receive inputs from the input interface 304 for inflation of the bladders 108, as discussed above.

At step 604, the apparatus 106 may actuate the blowers 200 for generating the air streams.

At step 606, the apparatus 106 may actuate the valves 202 for supplying the generated air streams.

At step 608, the apparatus 106 may further supply the generated air streams into the bladders 108.

At step 610, the apparatus 106 may enable the inflation of the bladders 108 of the article lift 102 using the generated air streams.

Further, at step 612, the apparatus 106 may determine whether the air supplied to the bladders 108 is filled up to a maximum capacity of the bladder 108 or not. If the air is filled in the bladders 108 up to the maximum capacity, then the method 600 may proceed to a step 614. Otherwise, the method 600 may return to the step 604 and may then continue to actuate the blowers 200 for generating the air streams.

At the step 614, the apparatus 106 may de-actuate the blowers 200.

Figure 7:
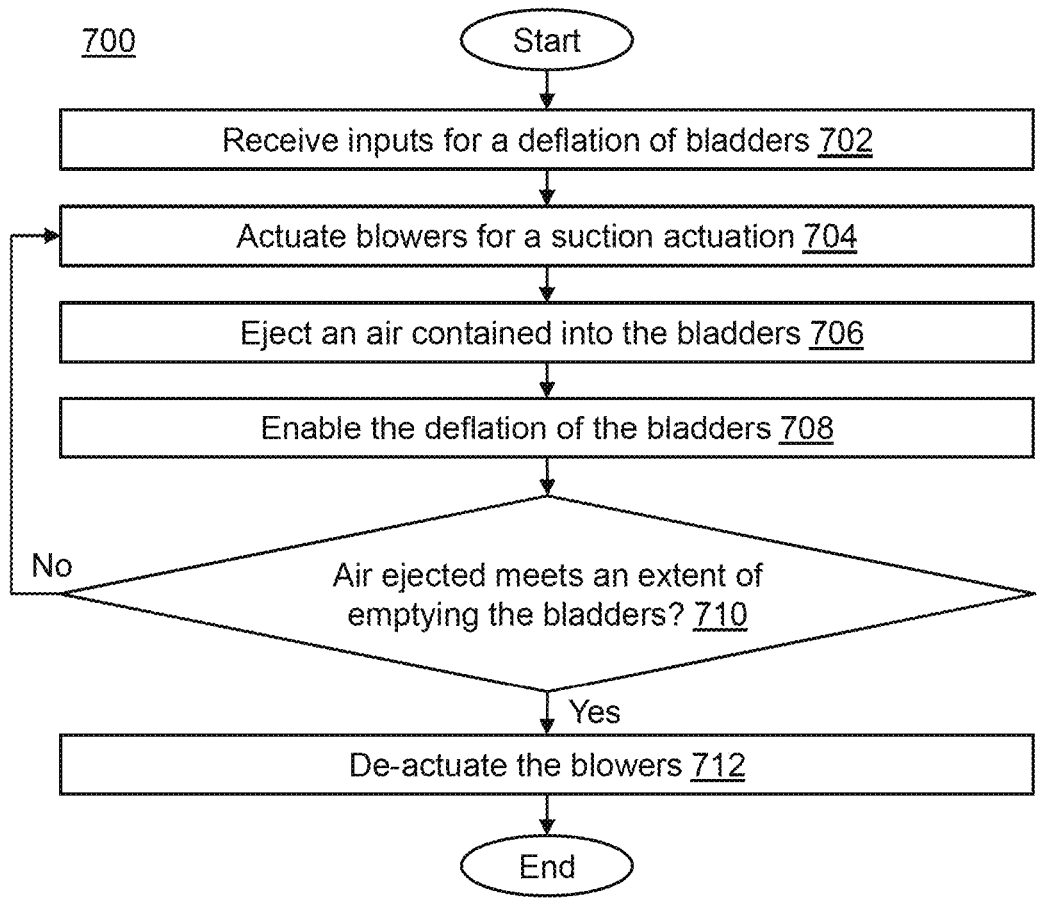
FIG. 7 illustrates a method for deflation of the bladders of the article lift, according to embodiments of the present invention disclosed herein.

FIG. 7 illustrates a method 700 for deflation of the bladders 108 of the article lift 102, according to embodiments of the present invention.

At step 702, the apparatus 106 may receive the inputs from the input interface 304 for the deflation of the bladders 108. The received inputs may be analyzed to determine an extent of emptying the bladders 108. The extent of emptying the bladders 108 may be a user defined input. The extent of emptying the bladders may be for example, but not limited to, a fully empty, a half-empty, a volume of the air to be ejected, a default volume of the air to be ejected from the bladders 108, and so forth.

At step 704, the apparatus 106 may actuate the blowers 200 for the suction actuation.

At step 706, the apparatus 106 may eject the air contained inside the bladders 108 via the exhaust ports 212.

At step 708, the apparatus 106 may further enable the deflation of the bladders 108 of the article lift 102.

At step 710, the apparatus 106 may determine whether the air contained in the bladders 108 meets the received input i.e. an extent of emptying the bladders 108. The apparatus 106 may compare one or more of a volume of the ejected air, the volume of the contained air, or the volume of the bladders 108 with the extent of emptying the bladders 108 received and/or determined by analyzing the received inputs. If the air ejected from the bladders 108 meets the extent of emptying the bladders 108, then the method 700 may proceed to a step 712. Otherwise, the method 700 may return to the step 704.

At step 712, the apparatus 106 may de-actuate the blowers 200 upon emptying the bladders 108 till the extent of emptying the bladders 108.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

The exemplary embodiments of this present invention have been described in relation to the adjustable air control apparatus. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

A number of variations and modifications of the present invention can be used. It would be possible to provide for some features of the present invention without providing others.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. An adjustable air control system, comprising:
a blower adapted to generate air streams;
a manifold adapted to receive the generated air streams from the blower;
a plurality of valves connected to the manifold, each valve adapted to regulate the generated air streams;
at least one air transmission port attached to at least one of the plurality of valves using a quick release clamp, wherein the air transmission port is adapted to provide an inlet passage for supplying the generated air streams into a bladder of an article lift; and
a control panel adapted to actuate each of the plurality of valves having the air transmission port to enable the supply of the generated air streams into the bladder of the article lift, wherein the control panel is part of an apparatus that includes the plurality of valves, and the at least one air transmission port, wherein the apparatus utilizes the at least one air transmission port to connect the apparatus to tubings that extend and connect to the bladder, and wherein the control panel dynamically adjusts an inflation or deflation of the bladder.

2. The system of claim 1, comprising an exhaust port connected with the manifold and adapted to provide an exhaust passage for an ejection of air contained in the bladder of the article lift.

3. The system of claim 1, wherein the quick release clamps are adapted to tighten onto a side of the air transmission port for enabling a fitting of each of the plurality of valves with its corresponding air transmission port.

4. The system of claim 1, wherein the tubings are connected from the air transmission port to the bladder of the article lift.

5. The system of claim 1, wherein the generated air streams are adjustable.

6. The system of claim 1, wherein the control panel is further adapted to actuate the blower to generate the air streams.

7. The system of claim 1, wherein the control panel comprises a processor, communicatively connected with an input interface, and is configured to actuate the blower upon receiving inputs from the input interface.

8. The system of claim 7, wherein the processor is further configured to enable actuation of the blower to eject air contained in the bladder of the article lift.

9. The system of claim 7, wherein the processor is further configured to receive a maximum air capacity of the bladder of the article lift from a memory.

* * * * *